United States Patent

Andrade et al.

[15] 3,647,941

[45] Mar. 7, 1972

[54] COLOR MODIFICATION APPARATUS FOR A COLOR TELEVISION SYSTEM

[72] Inventors: Philip Andrade, Long Island City; Thaddeus V. Rychlewski, Seneca Falls, both of N.Y.

[73] Assignee: Sylvania Electric Products Inc.

[22] Filed: Nov. 5, 1969

[21] Appl. No.: 874,271

[52] U.S. Cl. .......... 178/5.4 HE

[51] Int. Cl. .......... H04n 9/02

[58] Field of Search .......... 178/5.4 R, 5.4 HE

[56] References Cited

UNITED STATES PATENTS

| | | | |
|---|---|---|---|
| 2,888,514 | 5/1959 | Pritchard | 178/5.4 |
| 2,976,351 | 3/1961 | Loughlin | 178/5.4 |
| 3,525,802 | 8/1970 | Whiteneir, Jr. | 178/5.4 |

*Primary Examiner*—Richard Murray
*Assistant Examiner*—P. M. Pecori
*Attorney*—Norman J. O'Malley, Robert J. Frank and Robert E. Strausser

[57] ABSTRACT

An apparatus for modifying the displayed appearance of preselected colors presented on a color television screen without changing the appearance of other colors in the same picture. The apparatus detects and modifies chrominance signals which correspond to these preselected colors. In one embodiment of the invention the saturation level of all colors except flesh tones is boosted.

14 Claims, 5 Drawing Figures

Patented March 7 1972 3,647,941

3 Sheets-Sheet 1

INVENTORS.
PHILLIP ANDRADE
THADDEUS V. RYCHLEWSKI

R. J. Frank
ATTORNEY.

Patented March 7 1972 3,647,941

3 Sheets-Sheet 2

INVENTORS.
PHILLIP ANDRADE
THADDEUS V. RYCHLEWSKI
R. J. Frank
ATTORNEY.

INVENTORS.
PHILLIP ANDRADE
THADDEUS V. RYCHLEWSKI

R. J. Frank
ATTORNEY.

COLOR MODIFICATION APPARATUS FOR A COLOR TELEVISION SYSTEM

BACKGROUND OF THE INVENTION

This invention relates to color television and, more specifically, to apparatus for controlling the color output of a television display.

Color television receivers generally utilize a cathode-ray display tube to exhibit color picture information contained in an input video signal received and processed by the receiver circuits. The display tube, or color kinescope, includes a viewing screen comprised generally of a multiplicity of cathodoluminescent red-emitting, green-emitting and blue-emitting phosphor elements. These elements are typically arranged on the inner surface of the faceplate of the display tube in a regular array. By exciting these primary colored phosphor elements with electron beams the display tube can produce a wide variety of output colors for viewing.

In describing a particular color, it is convenient to refer to three qualities or attributes associated with the color. The first of these is "hue" which depends upon the light wavelength and which describes the nature of the color sensation, such as "red," "orange" or "yellow." The second attribute describes the intensity of coloration and is called "saturation." Saturation is the term used to denote the degree with which a color approaches a spectrally pure color. A saturated color is one which contains no white and, conversely, a color becomes less saturated as white is added thereto. The third attribute is that of "brightness."

A viewer of color television may desire to increase the saturation of the colors in a picture being viewed and can do so by adjusting an external control which generally regulates the saturation of the colors on the viewing screen. When the degree of color saturation in the displayed image is relatively high it is found that most colors have a vivid pleasing appearance and do not appear "washed out" (i.e. highly diluted with white light). However, certain colors, especially those specified as "flesh-tone" colors, cannot be pleasingly represented when they are highly saturated as they appear unnatural. Therefore, to achieve natural flesh tone representation it is often necessary to keep the display color saturation level adjusted to a value which does not yield the most vivid and pleasing background colors. As a solution to this problem it has been found that a more appealing television picture can be obtained if the video color signal is processed in a manner so as to increase the saturation of all areas of the display except where flesh tones are present.

Before summarizing the essential features of the invention, a brief review of conventional transmission and reception of color signals which are in accordance with the present FCC standards for compatible color television will permit the invention to be better understood.

In compatible simultaneous color television systems three signals, corresponding to the red, green and blue components of a picture as viewed by a television camera, are added in appropriate proportions to form a "luminance" signal. The luminance signal is descriptive of the brightness distribution in the picture (the sole information displayed by a monochrome receiver). In addition, difference signals between the red, green, and blue camera signals and the luminance signal are formed and these are caused to modulate a color subcarrier in different suitable selected phases. The resultant "chrominance" signal indicates the color hue by its phase and the color saturation by its amplitude relative to the luminance signal. The luminance and chrominance signals are added together to form the color video signal. Also, a "burst" of the color subcarrier is transmitted to provide a reference phase for the detection of the chrominance signal by the television receiver.

When the composite video signal is received by the color television receiver the luminance and chrominance signal components of the composite video are effectively separated. The chrominance signal is demodulated by synchronous detection to reproduce the color difference signals. The difference signals are then combined with the luminance signal to reproduce the red, green, and blue camera signals. These are applied to the electron guns of a color kinescope which sweeps out interlaced red, green and blue images on a composite phosphor screen.

As indicated above, the brightness information associated with a given color is represented by the amplitude of the luminance signal. The color hue information is a function of the relative phase of the chrominance signal. Finally, the color saturation information is a function of the ratio of the amplitude of the chrominance signal to the amplitude of the luminance signal.

When a conventional color television set receives an input video signal, the relative nature of the colors in the displayed picture is determined by the characteristics of such signal. The viewer can, of course, change the overall brightness, saturation or hue of the displayed picture by adjusting external controls which modify the signals being processed by the receiver. However, the relative relationship of colors appearing in a picture is fixed by their natural relationship as determined by the signals generated by the television camera viewing the image. For example, assume that an image being viewed by a television camera contains a highly saturated red area and a relatively unsaturated blue area. The saturation level of the blue area of the display could, if desired, be increased, say, by amplifying the chrominance signal. (This is effectively what is done when the viewer adjusts the knob which controls saturation.) However, this adjustment would necessarily also increase the saturation of the red area (and all other colors in the picture) to a level which may be undesirable. Similar examples could be given for changes in the brightness or hue of colors in a displayed picture. In each case, however, the relationship of the color qualities in different areas of the displayed picture are fixed by the natural relationship of the colors as viewed by the television camera.

SUMMARY OF THE INVENTION

The apparatus of the present invention varies the displayed appearance of preselected colors presented on a television screen without changing the appearance of other colors in the same picture. The resulting display presents a color picture which is not generally representative of the natural relationship of input colors as viewed by the television camera. We have found, however, that the resultant display is more pleasing to the average television viewer. The present apparatus modifies chrominance signals corresponding to input colors, as viewed by the television camera, which have a preselected range of hues. This range of hues may be, for example, the range of flesh tone hues. Means are provided for measuring the relative phase of the chrominance signal and for generating a first control signal whenever this relative phase lies within a range of values corresponding to the preselected range of hues. Means are also provided for modifying the chrominance signal as a function of this first control signal.

In a preferred embodiment of the invention, means are further provided for measuring the amplitude of the chrominance signal and for comparing this amplitude to the amplitude of the luminance signal. A second control signal is generated in accordance with this amplitude comparison and the chrominance signal is modified in accordance with both the first and the second control signals. In this manner, preselected colors are chosen for modification by detecting both hue and saturation information. This feature of the invention is utilized when the decision as to whether or not a color of a given hue should be modified is determined by the saturation of such color as well as by its hue.

The color modification apparatus of this invention operates upon the chrominance signal and can be employed in an individual television receiver. Alternatively, the apparatus can be employed at the television studio to operate upon the chrominance signal before it is combined with the luminance signal to form a composite video signal. The clear advantage of the former approach is that the extent of chroma modification can be left to the viewer's discretion.

Further features and advantages of the invention will become more readily apparent from the following detailed description when taken in conjunction with the accompanying drawings.

DESCRIPTION OF THE PREFERRED EMBODIMENT

Figure 1:
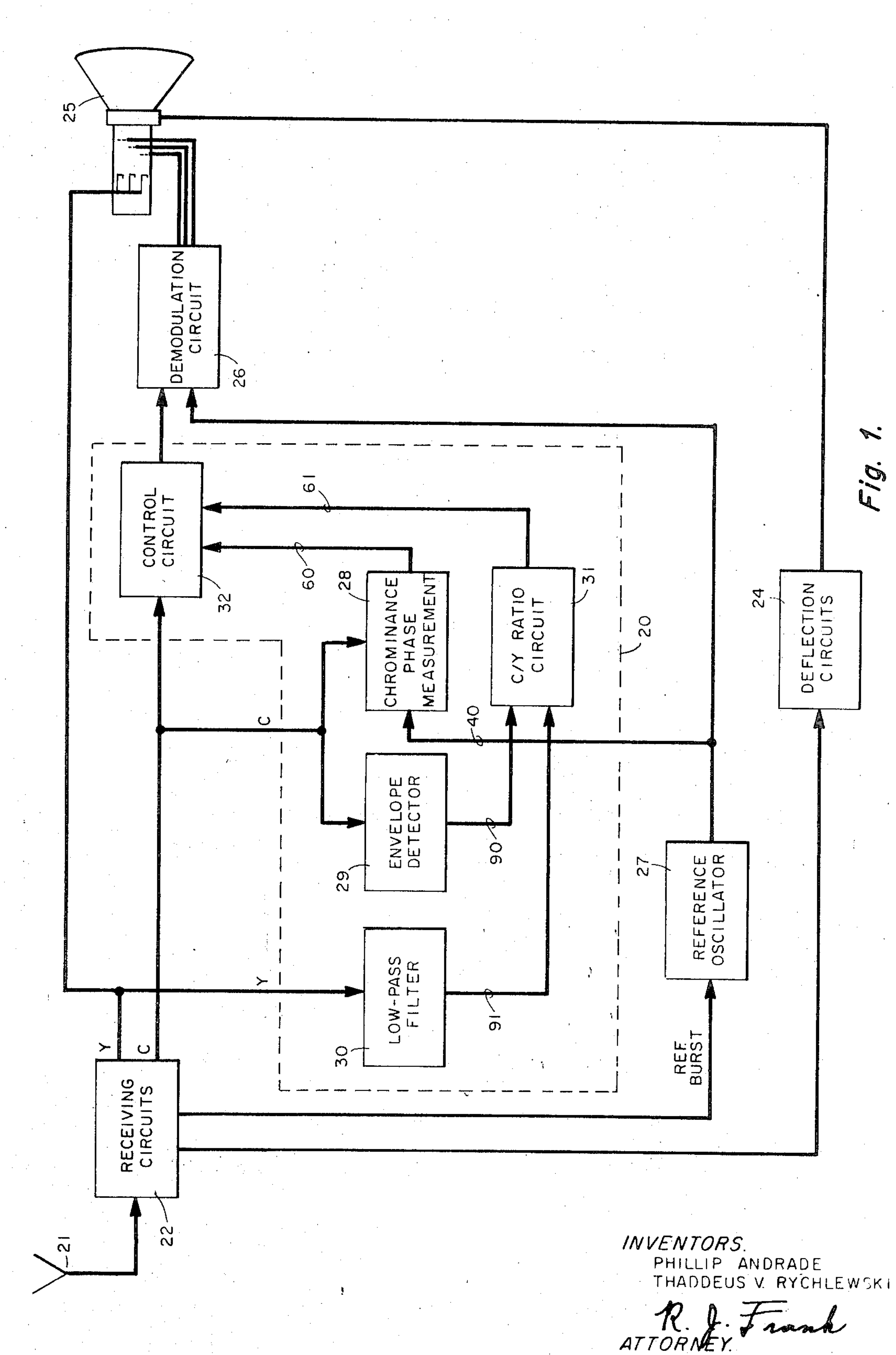
FIG. 1 is a block diagram of color television receiving system incorporating the invention.

Referring now to FIG. 1 there is shown a block diagram of a color television receiving system incorporating the apparatus of the invention which is enclosed by dashed area 20. The system includes an antenna 21 which feeds a received color television broadcast signal into receiving circuits 22. The circuits 22 serve the conventional functions of tuning, detecting, and amplifying the input signal from the antenna 21. Circuits 22 also detect and amplify video synchronizing signals which are fed to conventional deflection circuits 24 which drive the deflection coils of color kinescope 25. As these and certain other parts of the receiving system do not in themselves constitute part of the present invention, and are well known to those skilled in the art, they will not be described in detail except insofar as is necessary for an understanding of the present invention.

The television receiving system of FIG. 1 receives and processes either monochrome or N.T.S.C. color broadcasts. When a color broadcast is received, the receiving circuits 22 develop a chrominance signal, denoted in FIG. 1 as "C," and a luminance signal, denoted as "Y." The luminance signal is substantially similar to that developed by a monochrome receiver, and this signal is applied to the cathodes of the three electron guns of color kinescope 25.

The chrominance signal, C, is coupled through control circuit 32 to demodulation circuit 26. This signal which is developed at the transmitting station by combining two 3.58 MegaHertz signals in phase quadrature, is modulated with chroma information relating to two specific color difference signals. As in conventional television receivers, demodulation circuit 26 synchronously demodulates the chrominance signal using a 3.58 MegaHertz reference signal from reference oscillator 27. The phase of the reference signal from oscillator 27 is determined by a reference burst developed from the received broadcast signal. The outputs of the demodulation circuit 26 are the color difference signals and these are fed in conventional manner to the control grids of the three electron guns of color kinescope 25.

In accordance with the principles of the invention a sample of the chrominance signal is fed to chrominance phase measurement circuit 28. Circuit 28 measures the relative phase of the chrominance signal C with respect to that of the signal 40 from reference oscillator 27 and generates a control signal 60 whenever the relative phase falls within a predetermined range of values. A more detailed description of circuit 28 appears in a later portion of the specification. The chrominance signal is also fed to envelope detector 29, the output of which is a signal 90 that is proportional to the amplitude of the chrominance signal. Envelope detector 29 may consist, for example, of a full wave rectifier in combination with a low-pass filter.

A sample of the luminance signal Y is fed to a low-pass filter 30 having a bandwidth of 0.5 MegaHertz. The filter 30 eliminates high-frequency components from the luminance signal and provides a filtered luminance signal 91 having the same frequency limitation as the chrominance envelope signal 90. The signals 90 and 91 are received by ratio circuit 31 which determines the ratio of the amplitude of the chrominance signal to the amplitude of the luminance signal and generates a control signal 61 which is a function of this C/Y ratio. Ratio circuit 31 may consist, for example, of a pair of diodes coupled to the inputs of a difference amplifier. The diode characteristics are used to derive the logs of signals 90 and 91. These log signals are then subtracted by the difference amplifier to give an output voltage that is control signal 61.

Figure 2:
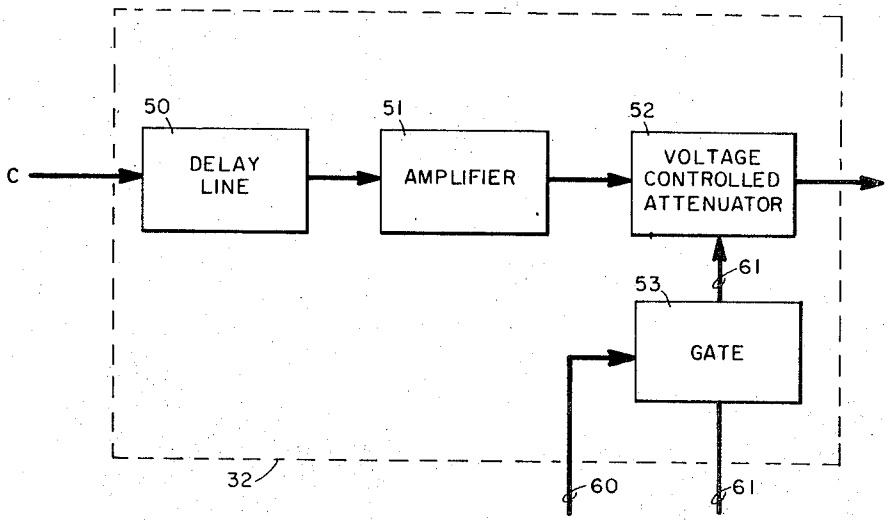
FIG. 2 is a block diagram of the control circuitry portion of FIG. 1.

The control signals 60 and 61 are fed to control circuit 32 which modifies the chrominance signal before it is received by demodulation circuit 26. Control circuit 32, as shown in FIG. 2, includes a delay line 50, an amplifier 51, a voltage controlled attenuator 50, and a gate 53. The delay line 52 delays the chrominance signal C to provide time synchronization with the control signals 60 and 61 which take a finite time to generate. The amplifier 51 boosts the amplitude of all chrominance signals, and the attenuator 52 attenuates selected chrominance signals in accordance with control signals 60 and 61. The voltage controlled attenuator may comprise, for example, a field-effect transistor having a gate electrode to which the voltage 61 is applied. The field-effect transistor operates as a voltage-controlled resistor. The voltage 61 is applied to attenuator 52 through the gate 53 which is turned on by control signal 60.

Figure 3:
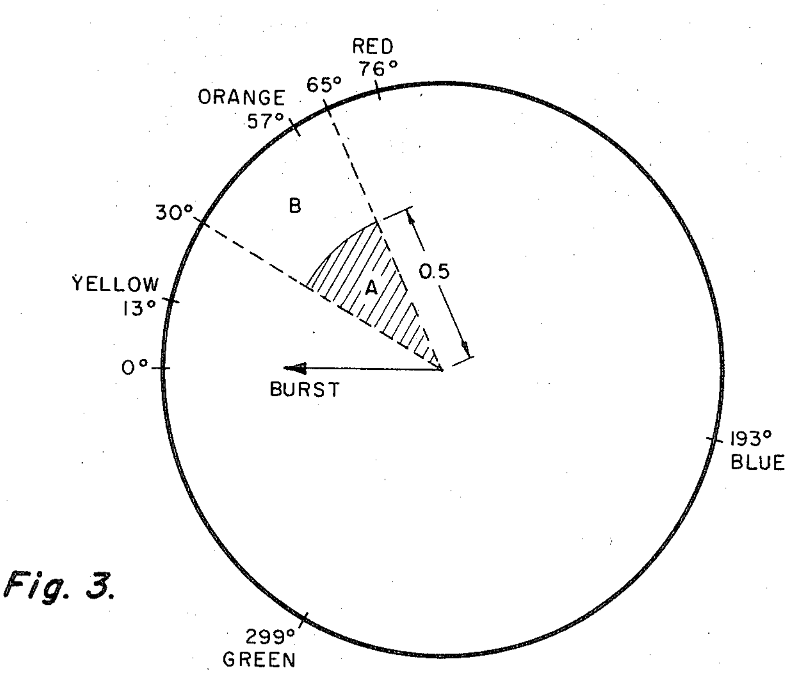
FIG. 3 is a diagram illustrating relationships between television signals and the colors which they represent.

The operation of the invention may be explained with the aid of FIG. 3 which is a "color circle" showing the relationship between a given color hue and the relative phase angle of the chrominance signal representing the color. Phase angles are measured with respect to the burst reference at 0°, the angles associated with various color being indicated on the circle. The degree of saturation is directly proportional to the radius of the color circle, the outer circumference representing unity saturation or fully saturated colors. The shaded area A, which includes the angular range 30°–65° and is located between yellow and red in the circle, approximates the group of colors often referred to as flesh tones. These colors are orangish in hue and are relatively unsaturated, having an indicated saturation (arbitrarily chosen) of 0.5 of maximum. As previously discussed, a more pleasing television picture is obtained by generally increasing the saturation of all colors in the displayed image except flesh tones. This is accomplished, by boosting the saturation level of all colors corresponding to chrominance signals having relative phase angles outside the chosen range 30°–65°. In addition, colors which have hues corresponding to the range 30°–65°, but which are relatively saturated (area B of FIG. 3) are also boosted. The amount by which these area B colors are boosted is determined by their saturation level, with colors which are close to flesh tones being boosted the least.

In the system of FIG. 1, a change in the saturation of a color is accomplished by control circuit 32 which attenuates the amplified chrominance signal in accordance with control signals 60 and 61. For example, when the chrominance phase measurement circuit 28 is set for the range 30°–65°, it will send a control signal 60 to control circuit 32 whenever the chrominance signal phase angle is in this range. The ratio circuit 31 generates a voltage 61 as a function of the C/Y ratio. The control circuit 32 attenuates the chrominance signal in accordance with signal 61 only when the signal 60 is present. This is accomplished by the gate 53 in circuit 32 (FIG. 2). The voltage controlled attenuator 52 is biased to provide for full attenuation for all control signals 61 corresponding to a C/Y saturation ratio of less than 0.5, and for decreasing attenuation as the saturation ratio increases between 0.5 and 1 (indicative of area "B" colors in FIG. 3). In this manner it is seen that the control circuit 32 fully attenuates only those chrominance signals representative of flesh tones, or, conversely, amplifies only those chrominance signals representative of nonflesh tones. The full attenuation setting of attenuator 52 is adjusted to offset the amplification of amplifier 51. The result is that colors having nonflesh tone hues are saturation boosted a maximum amount, colors having flesh tone hue but relatively high saturation (area B colors) are boosted an intermediate amount, and true flesh tones (area A colors) are not boosted. The gradual boosting of area B colors as a function of saturation (rather than, for example, a constant boost for all area B colors) prevents problems such as the quantum boosting of blotches within a single displayed face.

Figure 4:
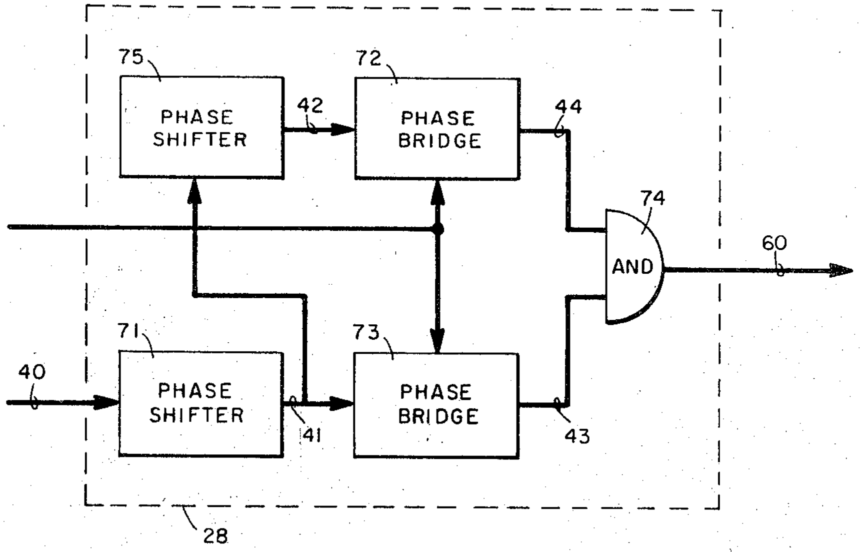
FIG. 4 is a block diagram of the chrominance phase measurement circuitry of the invention.

The chrominance phase measurement circuit 28 is further detailed in FIG. 4. Circuit 28 includes phase shifters 71 and 75, phase bridges 72 and 73, and AND-gate 74. The reference oscillator signal 40 is phase shifted and then phase compared with the chrominance signal C to determine if C has a relative phase with respect to the signal 40 of between 30° and 65°, chosen arbitratily herein as the range of phase angles corresponding to flesh tone hues. When this condition is met the control signal 60 is generated.

Figure 5:
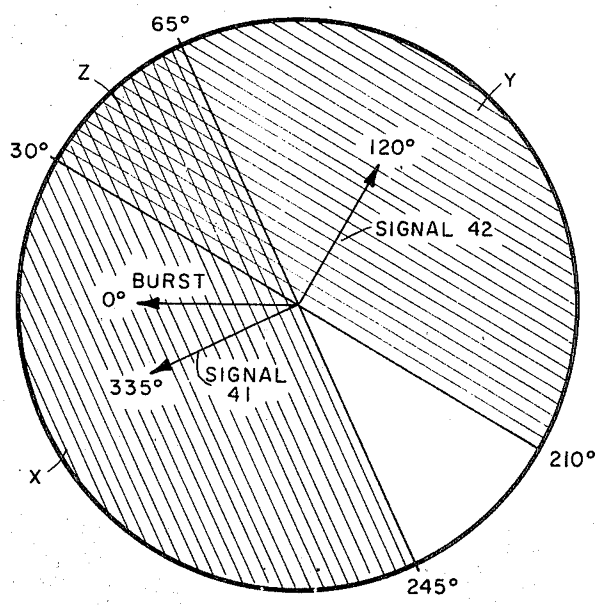
FIG. 5 is a diagram similar to FIG. 3 which is useful in explaining the operation of the chrominance phase measurement circuitry.

The operation of chrominance phase measurement circuit 28 is explained with the aid of FIG. 5 which shows a color wheel similar to that of FIG. 3. The reference oscillator signal 40 has a phase of 0° as established by the reference burst. Signal 40 is shifted 25° by phase shifter 71 to produce signal 41 at 335°. The signal 41 and the chrominance signal C are fed to phase bridge 73 which produces an output signal 43 whenever the chrominance signal C is out of phase with signal 41 by less than 90°. This condition is presented in FIG. 5 by the semicircle X. The signal 41 is also received by phase shifter 75 which shifts signal 41 by 145° and produces the signal 42 which has a relative phase of 120° with respect to the burst. Signal 42 and the chrominance signal C are fed to phase bridge 72 which produces an output signal 44 whenever the signal C is out of phase with signal 42 by less than 90°. This condition is presented in FIG. 5 by the semicircle Y. It will therefore be appreciated that AND-gate 74 will produce a control signal 60 only when the chrominance signal C has a phase angle between 30° and 65° with respect to the burst as is presented by the crosshatched wedge Z in FIG. 5. This means that a control signal 60 is sent to the control circuit 32 only when a flesh tone hue is sensed by chrominance phase measurement circuit 28. The location and width of the flesh tone range (wedge Z) can, of course, be adjusted by varying the amount of phase shift introduced by phase shifters 71 and 75.

The color modification apparatus 20 of the invention as described in FIG. 1 is incorporated in a color television receiver. The apparatus 20 modifies the chrominance signal before it is demodulated by the demodulation circuit 26. It will be appreciated, however, that the apparatus 20 can, if desired, be employed at the transmitter end of a color television system. In this case, the apparatus operates upon the chrominance signal before it is combined with the luminance signal and transmitted as a composite video signal.

What is claimed is:

1. An improved color television system of the type wherein an input color as viewed by a television camera is represented by a chrominance signal and a luminance signal, the chrominance signal having a phase which is a function of the hue of said input color and an amplitude which is a function of the saturation of said input color, wherein the improvement comprises:

a. signal generating means for measuring the relative phase of said chrominance signal with respect to a reference signal, and for generating a digital control signal whenever the relative phase lies within a range of values corresponding to a preselected range of hues;
b. gating means adapted to receive said digital control signal and to provide an output signal when said digital control signal is present; and
c. attenuating means coupled to receive said output signal and said chrominance signal, said attenuating means decreasing the amplitude of said chrominance signal while maintaining the phase of said chrominance signal constant when said output signal is present.

2. The improved color television system of claim 1 further comprising delay means for receiving and delaying said chrominance signal before passage of said chrominance signal to said attenuating means.

3. The improved color television system of claim 2 wherein said preselected range of hues is the range of flesh tone hues.

4. An improved color television system of the type wherein an input color as viewed by a television camera is represented by a chrominance signal and a luminance signal, the chrominance signal having a phase which is a function of the hue of said input color and an amplitude which is a function of the saturation of said input color, wherein the improvement comprises:

a. first signal generating means for measuring the relative phase of said chrominance signal with respect to a reference signal, and for generating a digital control signal whenever the relative phase lies within a range of values corresponding to a preselected range of hues;
b. means for measuring the amplitude of said chrominance signal;
c. second signal generating means for receiving and comparing the amplitude of said chrominance signal with the amplitude of said luminance signal and for generating a gain control signal in accordance with said comparison;
d. gating means adapted to receive said digital control signal and said gain control signal, said gating means transmitting said gain control signal whenever said digital control signal is present; and
e. attenuating means adapted to receive said gain control signal and said chrominance signal, said attenuating means decreasing the amplitude of said chrominance signal in accordance with said gain control signal while maintaining the phase of said chrominance signal constant.

5. The improved color television system of claim 4 further comprising a delay means for receiving and delaying said chrominance signal before passage of said chrominance signal to said attenuating means.

6. The improved color television system of claim 5 wherein said preselected range of hues is the range of flesh tone hues.

7. An improved color television receiving system for processing a composite video signal and for controlling the color output of a display device in accordance with said video signal, said video signal having a chrominance signal component which contains input color information and a reference burst signal component, said chrominance signal having a phase which is a function of the hue of the input color and an amplitude which is a function of the saturation of the input color, said receiving system including means for recovering said chrominance signal component from said composite video signal, a source of reference signal synchronized by said reference burst signal, and means for demodulating said chrominance signal in accordance with said reference signal, wherein said improvement comprises:

a. signal generating means for measuring the relative phase of said chrominance signal with respect to said reference signal and for generating a digital control signal whenever said relative phase lies within a range of values corresponding to a preselected range of hues;
b. gating means adapted to receive said digital control signal and to provide an output signal when said digital control signal is present; and
c. attenuating means coupled to receive said input signal and said chrominance signal, said attenuating means decreasing the amplitude of said chrominance signal while maintaining the phase of said chrominance signal constant when said output signal is present.

8. The improved color television receiving system as defined by claim 7 further comprising a delay means for receiving and delaying said chrominance signal before passage of said chrominance signal to said attenuating means.

9. The improved color television receiving system as defined by claim 8 wherein said preselected range of hues is the range of flesh tone hues.

10. An improved color television receiving system for processing a composite video signal and for controlling the color output of a display device in accordance with said video signal, said video signal having luminance, chrominance and reference burst signal components, said chrominance signal having a phase which is a function of the hue of the input color and an amplitude which is a function of the saturation of the input color, said receiving system including means for recovering said luminance and chrominance signals from said composite video signal, a source of reference signals synchronized by said reference burst signal, and means for demodulating said chrominance signal in accordance with said reference signal, wherein said improvement comprises:

a. first signal generating means, a sample of said chrominance signal and said reference signal being applied to said first signal generating means, said first signal generating means producing a digital control signal whenever the relative phase of said chrominance signal and said reference signal lies within a range of values corresponding to a preselected range of hues;
b. means for measuring the amplitude of said chrominance signal;
c. second signal generating means for receiving and comparing the amplitude of said chrominance signal with the amplitude of said luminance signal and for generating a gain control signal in accordance with said comparison;
d. gating means adapted to receive said digital control signal and said gain control signal, said gating means transmitting said gain control signal whenever said digital control signal is present; and
e. attenuating means adapted to receive said gain control signal and said chrominance signal, said attenuating means decreasing the amplitude of said chrominance signal in accordance with said gain control signal while maintaining the phase of said chrominance signal constant.

11. The improved color television receiving system as defined by claim 10 further comprising a delay means for receiving and delaying the chrominance signal before passage of said chrominance signal to said attenuating means.

12. The improved color television receiving system as defined by claim 11 wherein said preselected range of hues is a range of flesh tone hues.

13. The improved color television receiving system for processing a composite video signal and for controlling the color output of a display device in accordance with said video signal, said video signal having luminance, chrominance and reference burst signal components, said chrominance signal having a phase which is a function of the hue of the input color and an amplitude which is a function of the saturation of the input color, said receiving system including means for recovering said luminance and chrominance signals from said composite video signal, a source of reference signal synchronized by said reference burst signal, and means for demodulating said chrominance signal in accordance with said reference signal, wherein said improvement comprises:

a. a phase detector for receiving a first sample of said chrominance signal and a sample of said reference signal, said phase detector generating a digital control signal whenever the relative phase of said chrominance signal with respect to said reference signal lies within a range of values corresponding to a preselected range of hues;
b. an envelope detector for receiving a second sample of said chrominance signal;
c. a low-pass filter for receiving a sample of said luminance signal;
d. ratio detecting means for receiving the outputs of said envelope detector and said low-pass filter and for generating a gain control signal as a function of the ratio of the amplitude of said chrominance signal to the amplitude of said luminance signal;
e. delay means for receiving and delaying said chrominance signal;
f. means for amplifying said delaying chrominance signal;
g. gating means adapted to receive said digital control signal and said gain control signal, said gating means transmitting said gain control signal whenever said digital control signal is present; and
h. attenuating means adapted to receive said gain control signal and said chrominance signal, said attenuating means decreasing the amplitude of said chrominance signal in accordance with said gain control signal while maintaining the phase of said chrominance signal constant.

14. The improved color television system defined by claim 13 wherein said preselected range of hues is in the range of flesh tone hues.

* * * * *